(12) United States Patent
Wang

(10) Patent No.: US 12,570,288 B2
(45) Date of Patent: Mar. 10, 2026

(54) METHOD AND APPARATUS FOR MANAGING A VEHICLE PLATOON

(71) Applicant: LENOVO (BEIJING) LIMITED, Beijing (CN)

(72) Inventor: Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 213 days.

(21) Appl. No.: 17/429,917

(22) PCT Filed: Feb. 15, 2019

(86) PCT No.: PCT/CN2019/075262
§ 371 (c)(1),
(2) Date: Aug. 10, 2021

(87) PCT Pub. No.: WO2020/164129
PCT Pub. Date: Aug. 20, 2020

(65) Prior Publication Data
US 2022/0097698 A1      Mar. 31, 2022

(51) Int. Cl.
*B60W 30/14* (2006.01)
*B60W 30/165* (2020.01)
*G05D 1/00* (2006.01)
*G08G 1/00* (2006.01)

(52) U.S. Cl.
CPC ........ *B60W 30/165* (2013.01); *B60W 30/143* (2013.01); *G05D 1/0293* (2013.01); *G08G 1/22* (2013.01); *B60W 2556/65* (2020.02)

(58) Field of Classification Search
CPC ............. B60W 30/165; B60W 30/143; B60W 2556/65; G05D 1/0293; G05D 2201/0213; G08G 1/22
See application file for complete search history.

(56) References Cited

U.S. PATENT DOCUMENTS

| | | | |
|---|---|---|---|
| 5,331,561 A | 7/1994 | Barrett et al. | |
| 11,627,450 B2 * | 4/2023 | Iagnemma | G08G 1/0133 703/2 |

(Continued)

FOREIGN PATENT DOCUMENTS

| | | | | |
|---|---|---|---|---|
| BR | 112015019861 B1 * | 7/2022 | | G08G 1/22 |
| CN | 106997675 A | 8/2017 | | |

(Continued)

OTHER PUBLICATIONS

Internation Searching Authority, "Written Opinion of the International Searching Authority," PCT/CN2019/075262, Nov. 15, 2019, pp. 1-4.

*Primary Examiner* — Rachid Bendidi
*Assistant Examiner* — Nada Mahyoob Alqaderi
(74) *Attorney, Agent, or Firm* — Kunzler Needham & Hilton

(57) ABSTRACT
A method for managing a vehicle platoon is provided. The method includes transmitting one or more driving parameters to a vehicle in the vehicle platoon (503); wherein the one or more driving parameters comprise: a set of a target speed and a tolerance of speed, a set of a target spacing between the vehicle and another vehicle followed by the vehicle and a tolerance of spacing, a ramp speed value, a ramp spacing value, or combination of the above.

18 Claims, 4 Drawing Sheets

(56) References Cited

U.S. PATENT DOCUMENTS

| | | | |
|---|---|---|---|
| 2009/0088924 A1* | 4/2009 | Coffee | B28C 5/422 |
| | | | 701/31.4 |
| 2010/0256852 A1* | 10/2010 | Mudalige | G08G 1/22 |
| | | | 701/24 |
| 2013/0116908 A1* | 5/2013 | Oh | G05D 1/0295 |
| | | | 701/96 |
| 2013/0218365 A1* | 8/2013 | Caveney | G05D 1/0295 |
| | | | 701/1 |
| 2018/0210464 A1* | 7/2018 | Switkes | B60W 10/18 |
| 2018/0319400 A1 | 11/2018 | Kleinau et al. | |
| 2019/0025819 A1* | 1/2019 | Ferguson | G05D 1/0088 |
| 2019/0025857 A1 | 1/2019 | Luckevich et al. | |
| 2019/0188817 A1* | 6/2019 | Yanagida | G06Q 10/06311 |
| 2019/0241185 A1* | 8/2019 | Kuszmaul | B60W 30/165 |
| 2019/0250639 A1* | 8/2019 | Xu | G08G 1/0145 |
| 2020/0033885 A1* | 1/2020 | Kim | G01S 13/931 |
| 2020/0033887 A1* | 1/2020 | Kim | H04W 12/10 |
| 2020/0201356 A1* | 6/2020 | Schuh | B60W 30/165 |
| 2020/0267603 A1* | 8/2020 | Mach | H04W 4/46 |
| 2020/0314728 A1* | 10/2020 | Reimann | H04W 40/12 |
| 2021/0258743 A1* | 8/2021 | Boban | G08G 1/22 |
| 2022/0198934 A1* | 6/2022 | Chang | H04W 4/023 |

FOREIGN PATENT DOCUMENTS

| | | | | |
|---|---|---|---|---|
| CN | 108475465 A | | 8/2018 | |
| EP | 3200169 A1 | | 8/2017 | |
| EP | 3316553 A1 | * | 5/2018 | H04W 72/51 |
| JP | 2006091951 A | * | 4/2006 | |
| JP | 5071396 B2 | | 11/2012 | |
| JP | 2015022420 A | * | 2/2015 | |
| WO | 2015047177 A1 | | 4/2015 | |
| WO | WO-2015047178 A1 | * | 4/2015 | G08G 1/22 |

* cited by examiner

1

METHOD AND APPARATUS FOR MANAGING A VEHICLE PLATOON

TECHNICAL FIELD

The present application generally relates to vehicle platooning, and more specifically relates to a method and apparatus for managing and controlling a vehicle in vehicle platooning.

BACKGROUND

Vehicle to everything (V2X) has been introduced into 5G wireless communication technology. 3GPP NR (New radio) V2X supports multiple advanced V2X services, wherein one advanced V2X service is vehicle platooning. The vehicle platooning under a V2X scenario may also be referred to as V2X vehicle platooning, a V2X vehicle platoon, a vehicle platoon, a V2X vehicle platoon system, a vehicle platoon system, or the like.

Vehicle platooning enables the vehicles to dynamically form a platoon travelling together. All the vehicles in the platoon obtain information from a leading vehicle or a network entity. Such information allows the vehicles, which go to the same direction and travel together, to drive closer than normal in a coordinated manner.

In view of the above, a mechanism for managing and controlling a vehicle in vehicle platooning is required.

SUMMARY

Some embodiments of the present application provide a method for managing a vehicle platoon. The method includes transmitting one or more driving parameters to a vehicle in the vehicle platoon; wherein the one or more driving parameters comprise: a set of a target speed and a tolerance of speed, a set of a target spacing between the vehicle and another vehicle followed by the vehicle and a tolerance of spacing, a ramp speed value, a ramp spacing value, or combination of the above.

Some embodiments of the present application provide an apparatus. The apparatus includes: a non-transitory computer-readable medium having stored thereon computer-executable instructions, a receiving circuitry, a transmitting circuitry, and a processor coupled to the non-transitory computer-readable medium, the receiving circuitry and the transmitting circuitry, wherein the computer-executable instructions cause the processor to implement a method for managing a vehicle platoon.

Some embodiments of the present application provide a method performed by a vehicle in a vehicle platoon. The method includes receiving one or more driving parameters for the vehicle; wherein the one or more driving parameters comprise: a set of a target speed and a tolerance of speed, a set of a target spacing between the vehicle and another vehicle followed by the vehicle and a tolerance of spacing, a ramp speed value, a ramp spacing value, or combination of the above.

Some embodiments of the present application also provide an apparatus. The apparatus includes: a non-transitory computer-readable medium having stored thereon computer-executable instructions, a receiving circuitry, a transmitting circuitry, and a processor coupled to the non-transitory computer-readable medium, the receiving circuitry and the transmitting circuitry, wherein the computer-executable instructions cause the processor to implement a method performed by a vehicle in a vehicle platoon.

BRIEF DESCRIPTION OF THE DRAWINGS

In order to describe the manner in which advantages and features of the present application can be obtained, a description of the present application is rendered by reference to specific embodiments thereof which are illustrated in the appended drawings. These drawings depict only exemplary embodiments of the present application and are not therefore to be considered as limiting of its scope.

DETAILED DESCRIPTION

Figure 1:
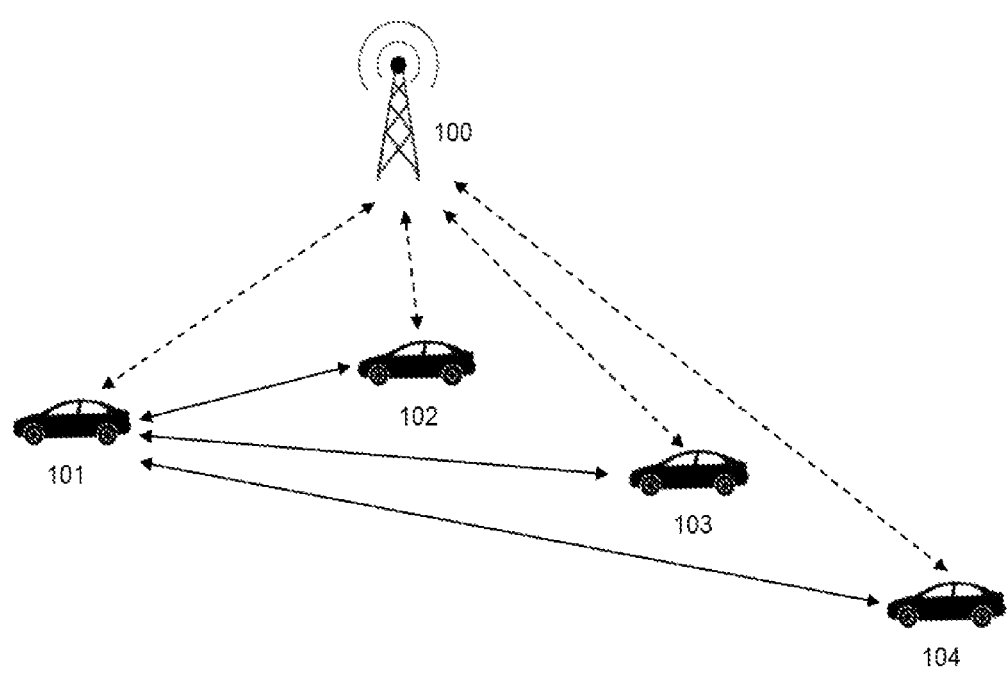
FIG. 1 illustrates an exemplary vehicle platoon in accordance with some embodiments of the present application.

The detailed description of the appended drawings is intended as a description of the currently preferred embodiments of the present application, and is not intended to represent the only form in which the present application may be practiced. It should be understood that the same or equivalent functions may be accomplished by different embodiments that are intended to be encompassed within the spirit and scope of the present application.

Generally, a vehicle platoon enables vehicles to dynamically form a platoon travelling together. A vehicle platoon operates a group of vehicles in a closely linked manner, so that the vehicles move like a train with virtual strings attached between the vehicles. A vehicle platoon may include two or more vehicles. A vehicle(s) under an NR V2X scenario may also be referred to as a UE(s) or a V2X UE(s). A special vehicle of a vehicle queue within a vehicle platoon may be referred to as a leading vehicle, a lead vehicle, a lead user equipment (UE), a heading vehicle, a head vehicle, a head UE, or the like. Other vehicle(s) of the vehicle queue within the vehicle platoon may be referred to as a member vehicle(s), a member UE(s), or the like.

In a vehicle platoon, a leading vehicle may send control information to all member vehicles in the vehicle platoon to establish and/or manage this vehicle platoon. Alternatively, a base station (BS), a scheduling UE or other network entity may send control information to all vehicles in a vehicle platoon to establish and/or manage this vehicle platoon. The control information transmitted to vehicles in a vehicle platoon allow the vehicles to drive closer than normal in a coordinated manner, go in the same driving direction, and travel together like a train. By using a vehicle platoon, distances between vehicles may be reduced, overall energy or fuel consumption may be lowered, and the total number of drivers for vehicles needed in a vehicle platoon may be reduced. Within a vehicle platoon, a distance between vehicles may also be referred to as an interval between vehicles or spacing between vehicles.

A BS under NR V2X scenario may be referred to as an access point, an access terminal, a base, a base station, a macro cell, a Node-B, an enhanced Node B (eNB), a gNB, a Home Node-B, a relay node, a device, a base unit, or by any other terminology used in the art. A BS may be distributed over a geographic region. Generally, a BS is a part of a radio access network that may include one or more controllers communicably coupled to one or more corresponding base stations.

A BS is generally communicably coupled to one or more packet core networks (PCN), which may be coupled to other networks, like the packet data network (PDN) (e.g., the Internet) and public switched telephone networks, among other networks. These and other elements of radio access and core networks are not illustrated but are well known generally by those having ordinary skill in the art. For example, one or more BSs may be communicably coupled to a mobility management entity (MME), a serving gateway (SGW), and/or a packet data network gateway (PGW).

A BS may serve a number of V2X UEs within a serving area, for example, a cell or a cell sector via a wireless communication link. A BS may communicate directly with one or more of V2X UEs via communication signals. For example, a BS may serve V2X UEs within a macro cell.

A BS transmits downlink (DL) communication signals to serve a V2X UE in time domain, frequency domain, and/or spatial domain. Furthermore, the DL communication signals may be carried over wireless communication links. The wireless communication links may be any suitable carrier in licensed or unlicensed radio spectrum. The wireless communication links facilitate communication between the V2X UEs and the BS.

Currently, 3GPP defines two typical vehicle densities with uniform distances between each two vehicles in a vehicle platoon. One typical vehicle density defined in 3GPP is that all uniform distances between vehicles in a vehicle platoon are greater than two meters. The vehicle platoon with this typical vehicle density may be referred to as a normal density vehicle platoon, a normal density platoon, normal density platooning, a normal density platoon system, or the like.

Another typical vehicle density defined in 3GPP is that all uniform distances between vehicles in a vehicle platoon are only one meter. The vehicle platoon with this typical vehicle density may be referred to as a high density vehicle platoon, a high density platoon, high density platooning, a high density platoon system, or the like. With uniform one meter between vehicles in a vehicle platoon, when the vehicle platoon as a whole moves at a speed of 100 kilometers per hour, each vehicle in the vehicle platoon moves one meter per 36 millisecond.

In a vehicle platoon system, in order to achieve good system efficiency, several issues need to be solved: for example, how to efficiently implement a vehicle platoon with the required performance metric, how to efficiently implement a vehicle platoon with the required performance safety, how to manage suitable distances among vehicles in a vehicle platoon, or how to manage suitable driving speed among vehicles in a vehicle platoon.

According to some embodiments of the present application, a vehicle(s) in the vehicle platoon shares information (such as, status information, speed information, distance (i.e., space, spacing, or interval) information, driving direction information, intention information, and etc.) with other vehicles in the vehicle platoon. For example, intention information of a vehicle shared between a vehicle platoon may include braking intention or acceleration intention. The information shared between vehicle(s) in a vehicle platoon may be used to maintain or keep a distance(s) between vehicles in a vehicle platoon unchanged or uniform.

Some embodiments of the present application provide a mechanism for managing a vehicle in a vehicle platoon. Some embodiments of the present application provide a mechanism performed by a vehicle in a vehicle platoon. Some embodiments of the present application provide an apparatus for managing a vehicle in a vehicle platoon. Some embodiments of the present application provide an apparatus to implement a mechanism performed by a vehicle in a vehicle platoon.

Some embodiments of the present application define specific behaviors of a leading vehicle to implement a mechanism for managing a vehicle in a vehicle platoon. Some embodiments of the present application define specific behaviors of a BS to implement a mechanism for managing a vehicle in a vehicle platoon. Embodiments of the present application define specific behaviors of other network entities to implement a mechanism for managing a vehicle in a vehicle platoon.

Embodiments of the present application may be provided in a network architecture that adopts various service scenarios, for example but is not limited to, 3GPP 3G, long-term evolution (LTE), LTE-Advanced (LTE-A), 3GPP 4G, 3GPP 5G NR (new radio), 3GPP LTE Release 12 and onwards, etc. It is contemplated that along with the 3GPP and related communication technology development, the terminologies recited in the present application may change, which should not affect the principle of the present application.

FIG. 1 illustrates an exemplary vehicle platoon in accordance with some embodiments of the present application. As shown in FIG. 1, the vehicle platoon includes a base station, i.e., BS 100, and some vehicles, i.e., vehicle 101, vehicle 102, vehicle 103, and vehicle 104. BS 100 may transmit information to each vehicle in the vehicle platoon or receive information from each vehicle in the vehicle platoon. All of vehicle 101, vehicle 102, vehicle 103, and vehicle 104 may be configured to receive information from BS 100 or transmit information to BS 100.

In a vehicle platoon, a member vehicle may receive information from a leading vehicle in the vehicle platoon. A member vehicle may also transmit information to the leading vehicle in the vehicle platoon. A vehicle(s) in a vehicle platoon may communicate with other vehicle(s) through a unicast transmission manner, a groupcast transmission manner, or a broadcast transmission manner.

According to some embodiments of the present application, vehicle 101 in FIG. 1 functions as a leading vehicle, and each of vehicle 102, vehicle 103, and vehicle 104 functions as a member vehicle. Accordingly, vehicle 101 may transmit information to each of vehicle 102, vehicle 103, and vehicle 104; and each of vehicle 102, vehicle 103, and vehicle 104 may transmit information to vehicle 101.

It is contemplated that, in accordance with some other embodiments of the present application, a vehicle platoon may include more or fewer BSs and more or fewer vehicles. It is contemplated that, in accordance with some other embodiments of the present application, names of vehicles (which represent a leading vehicle or a member vehicle) shown in FIG. 1 may be different, e.g., vehicle 107, vehicle 108, and vehicle 109 or the like. Moreover, although each vehicle shown in FIG. 1 is illustrated in the shape of a car, it is contemplated that a vehicle platoon may include any type of UE in accordance with some other embodiments of the present application. Each of FIGS. 2-4 in the present application has the same characteristics as those of FIG. 1.

According to some embodiments of the present application, a BS (e.g., BS 100 as shown in FIG. 1) sends control information to all vehicles (e.g., vehicle 101, vehicle 102, vehicle 103, and vehicle 104 as shown in FIG. 1) to establish and/or manage a vehicle platoon.

According to some embodiments of the present application, a vehicle (e.g., vehicle 101 as shown in FIG. 1) sends control information to each vehicle (e.g., each of vehicle 102, vehicle 103, and vehicle 104 as shown in FIG. 1) to establish and/or manage a vehicle platoon. Under these scenarios, vehicle 101 functions as a leading vehicle in the vehicle platoon; and vehicle 102, vehicle 103, and vehicle 104 function as member vehicles in the vehicle platoon.

For instance, vehicle 101 transmits control information to each of vehicle 102, vehicle 103, and vehicle 104 in a unicast session. For a further instance, vehicle 101 transmits control information to each of vehicle 102, vehicle 103, and vehicle 104 in a groupcast session. For another instance, vehicle 101 transmits control information to each of vehicle 102, vehicle 103, and vehicle 104 in a broadcast session.

For controlling the speed of a vehicle or the spacing between two neighboring vehicles in the platoon, the control information transmitted to a vehicle(s) comprises one or more driving parameters. For instance, the one or more driving parameters may include: a target speed, a tolerance of the target speed, a target spacing between a vehicle and another vehicle followed by the vehicle, a tolerance of the target spacing, a ramp speed value; a ramp spacing value, or a combination thereof.

A driving parameter(s) may include a set of "a target speed" and "a tolerance of the target speed." A driving parameter(s) may include a set of "a target spacing between a vehicle and a preceding vehicle followed by the vehicle" and "a tolerance of the target spacing." A tolerance of the target spacing may be a spacing value or a percentage of the target spacing. Similarly, a tolerance of the target speed may be a speed value or a percentage of the target speed.

For instance, if a tolerance is a signaled value and represented, for example, as a symbol "&", a driving parameter(s) may include a range can be [target–&, target+&]. If a tolerance is a signaled proportion value and, for example, represented as a symbol "& %", a driving parameter(s) may include a range can be [(1–& %)*target, (1+& %)*target].

A ramp speed value relates to a step size for adjusting a speed of a vehicle. In some embodiments of the present application, the vehicle receiving a set of the target speed and the tolerance of the target speed would increase or decrease its speed gradually, so as to meet the target speed. In some embodiments of the present application, the vehicle may directly adjust its speed to meet the target speed. Similarly, a ramp spacing relates to a step size for adjusting spacing between two neighboring vehicles. The vehicle may gradually or directly adjust the spacing between the vehicle and a preceding vehicle. The mechanism for adjusting the speed or spacing will be comprehensively discussed later.

According to some embodiments of the present application, another type of a network entity (e.g., a scheduler UE or a scheduling UE), other than a BS or a leading vehicle, sends control information to all vehicles (e.g., vehicle 101, vehicle 102, vehicle 103, and vehicle 104 as shown in FIG. 1) to establish and/or manage a vehicle platoon.

According to some embodiments of the present application, control information transmitted to a vehicle(s) is used to establish a vehicle platoon. According to some embodiments of the present application, control information transmitted to a vehicle(s) is used to manage a vehicle platoon. The control information transmitted to a vehicle(s) may be used to adjust a speed of the vehicle(s). The control information transmitted to a vehicle(s) may be used to adjust a spacing between the vehicle(s) and another vehicle followed by the vehicle(s). The control information transmitted to a vehicle(s) may be used to adjust both a speed and a spacing of the vehicle(s).

In some embodiments of the present application, a leading vehicle, a BS, a scheduling UE (e.g., a scheduler UE), or other network entity may transmit at least one of a target spacing and a target speed to a vehicle via PC5 interface, Uu interface, or other type of interface. For a further example, a leading vehicle, a BS, or other network entity may further transmit a tolerance of the at least one of the target spacing and speed to a vehicle via PC5 interface, Uu interface, or other type of interface.

In some embodiments of the present application, a target spacing or a target speed as well as a tolerance of the target spacing or target speed target is pre-defined to a vehicle(s). In some embodiments of the present application, the target spacing or target speed as well as a tolerance of the target spacing or target speed target is signaled via a signaling (such as, RRC signaling, MAC signaling, or L1 control signaling).

Figure 2:
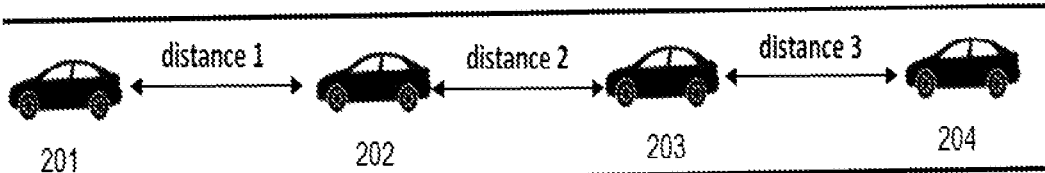
FIG. 2 illustrates another exemplary vehicle platoon in accordance with some embodiments of the present application.

FIG. 2 illustrates another exemplary vehicle platoon in accordance with some embodiments of the present application. Similar to FIG. 1, the vehicle platoon implemented in the embodiments of FIG. 2 includes unicast transmission manner, groupcast transmission manner, and broadcast transmission manner; and the total number of BSs, the total number of vehicles, and names of vehicles (which represent a leading vehicle or a member vehicle) shown in FIG. 2 may vary.

According to the embodiments of FIG. 2, a vehicle platoon has been established. All vehicles in the vehicle platoon in FIG. 2 go in the same driving direction and travel together like a train with virtual strings attached between the vehicles. Moreover, each vehicle within the vehicle platoon keeps a certain distance from its preceding vehicle in the vehicle platoon.

Specifically, vehicle 201 represents a leading vehicle, and each of vehicle 202, vehicle 203, and vehicle 204 represents a member vehicle. Distance 1 represents an actual physical distance between vehicle 201 and vehicle 202, distance 2 represents an actual physical distance between vehicle 202 and vehicle 203, and distance 3 represents an actual physical distance between vehicle 203 and vehicle 204.

In some embodiments, all vehicles 201, 202, 203, and 204 in the vehicle platoon have the same distance or spacing between each other. In some embodiments, all vehicles 201, 202, 203, and 204 in the vehicle platoon have the same speed. In some embodiments, all vehicles 201, 202, 203, and 204 in the vehicle platoon have both the same speed and the same distance (or spacing) from their preceding vehicles.

In some embodiments, if the vehicle platoon in FIG. 2 has a typical vehicle density as defined in 3GPP, each of distance 1, distance 2, and distance 3 has an identical value. For example, if the vehicle platoon in FIG. 2 is a normal density vehicle platoon, each of distance 1, distance 2, and distance

3 is uniform and greater than two meters. If the vehicle platoon in FIG. 2 is a high density vehicle platoon, each of distance 1, distance 2, and distance 3 is uniform and one meter.

During an actual driving process of a vehicle platoon, if a distance (e.g., distance 1 as shown in FIG. 2) between two vehicles changes, distances between vehicles are not uniform and the density of the vehicle platoon changes. Accordingly, a mechanism of managing a vehicle platoon needs to be implemented, so as to adjust the distance (or spacing) and/or speed of a vehicle(s) in the vehicle platoon, such that the vehicle platoon reaches to a uniform density (e.g., a typical vehicle density defined in 3GPP).

According to some embodiments of the present application, a vehicle(s) in a vehicle platoon reports at least one of real-time measured spacing information, predicted spacing information, real-time measured speed information, and predicted speed information to a leading vehicle, a BS, a scheduling UE, or other network entity. A vehicle(s) in a vehicle platoon may report the abovementioned information in a defined time window.

The real-time measured spacing information may be distance-based, and the distance-based spacing information represents an absolute physical distance (e.g., distance 1 as shown in FIG. 2) from a vehicle (e.g., vehicle 202 as shown in FIG. 2) to a preceding vehicle (e.g., vehicle 201 as shown in FIG. 2). The absolute physical distance may be measured in meters or other length metric.

The real-time measured spacing information may be time-based, and the time-based spacing information represents an absolute time (in millisecond or second) of a vehicle (e.g., vehicle 202 as shown in FIG. 2) to reach a preceding vehicle (e.g., vehicle 201 as shown in FIG. 2). It can be contemplated that a product of the absolute time and the current speed of a vehicle (e.g., vehicle 202 as shown in FIG. 2) equals to an absolute physical distance from the vehicle to the preceding vehicle (e.g., vehicle 201 as shown in FIG. 2).

A BS, a scheduling UE, or other network entity may configure a vehicle(s) to report real-time measured spacing information whether in a time-based way or a distance-based way. Alternatively, a vehicle may select to report real-time measured spacing information whether in a time-based way or a distance-based way.

According to some embodiments of the present application, a vehicle(s) in a vehicle platoon further reports, to a leading vehicle, a BS, a scheduling UE, or other network entity, a measured speed quality value associated with real-time measured speed information, a measured spacing quality associated with real-time measured spacing information, or both of them, in order to implement an enhanced control of the vehicle platoon. Each of a measured speed quality value and a measured spacing quality may be an accuracy level or confidence level.

According to some embodiments of the present application, an accuracy level or a confidence level may be a fixed value (e.g., 95%) defined in a standard. For instance, only if the real-time measured speed/spacing information reaches a defined fixed confidence level, will a vehicle(s) in a vehicle platoon report the measured speed/spacing information and its fixed confidence level thereof. If the real-time measured speed/spacing information does not reach the defined fixed confidence level, a vehicle(s) in a vehicle platoon will not report the measured speed/spacing information and its fixed confidence level thereof.

According to some embodiments of the present application, a network may configure a specific accuracy/confidence level based on real network operations or actual network situations, and then transmit the specific accuracy/confidence level to a vehicle(s) in a vehicle platoon via signaling. Under this case, a vehicle(s) in a vehicle platoon will measure and report the measured speed/spacing information with the received specific accuracy/confidence level.

According to some embodiments of the present application, a vehicle(s) in a vehicle platoon may generate a table including mapping relationship(s) between confidence level(s) and the measured speed/spacing value(s). A neighboring vehicle(s) may receive measured speed/spacing value(s) and the associated confidence level from a vehicle(s), and then decide its own behaviors (e.g. speed up or slow down) using the received confidence level. A leading vehicle, a BS, a scheduling UE, or other network entity may receive measured speed/spacing value(s) and the associated confidence level from a vehicle(s), and then transmit an adjustment command to the vehicle(s) based on the spacing information and the speed information.

In some embodiments of the present application, a vehicle(s) in a vehicle platoon may periodically report spacing and speed measurement results. The reporting period may be configured by a leading vehicle, a BS, a scheduling UE, or other network entity.

In some embodiments of the present application, a vehicle(s) in a vehicle platoon may report spacing and speed measurement results triggered by an event. The event may include: the vehicle(s) reaching a speed threshold; the vehicle(s) reaching a spacing threshold; expiration of a timer; expiration of a counter; the vehicle(s) arriving at a special location; the vehicle(s) entering or re-entering into the vehicle platoon, or a combination thereof. For example, the event is configured as a lower bound of speed, an upper bound of speed, or both of lower and upper bounds of speed. For a further example, the event is configured as automatically starting to report via a default parameter when a vehicle(s) enters or re-enters into a vehicle platoon.

Figures 3, 4:
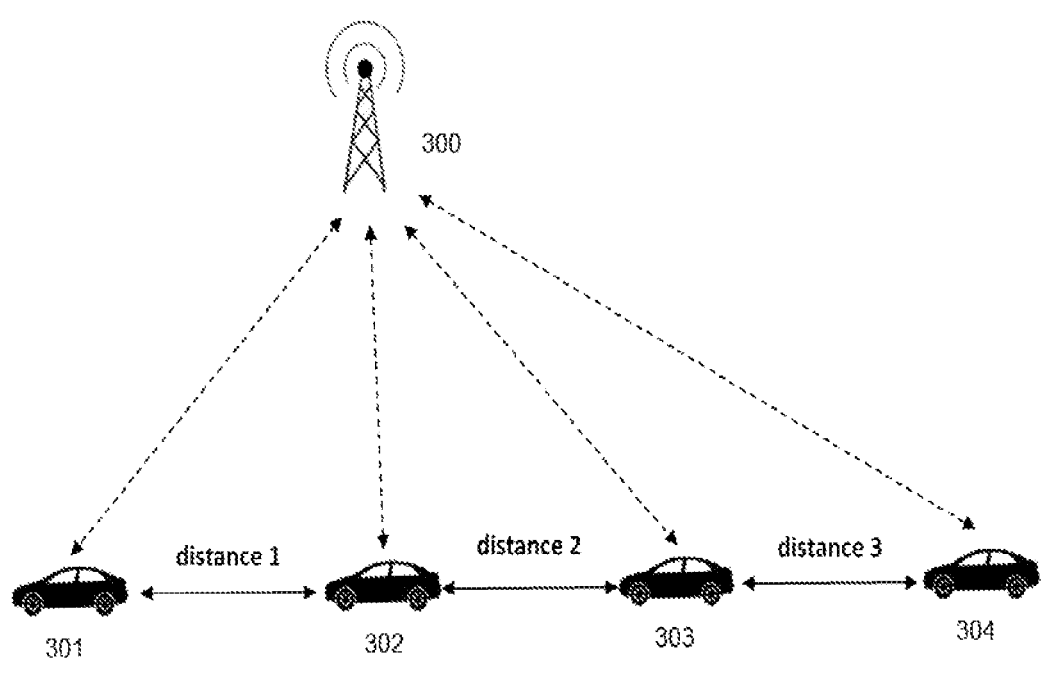
FIG. 3 illustrates another exemplary vehicle platoon in accordance with some embodiments of the present application.
FIG. 4 illustrates another exemplary vehicle platoon in accordance with some embodiments of the present application.

FIG. 3 illustrates another exemplary vehicle platoon in accordance with some embodiments of the present application. Similar to FIGS. 1 and 2, the vehicle platoon implemented in the embodiments of FIG. 3 includes unicast transmission manner, groupcast transmission manner, and broadcast transmission manner; and the total number of BSs, the total number of vehicles, and names of vehicles (which represent a leading vehicle or a member vehicle) shown in FIG. 3 may vary.

Similar to FIG. 2, each vehicle within the vehicle platoon shown in FIG. 3 keeps a certain distance from its preceding vehicle in the vehicle platoon, i.e., distance 1 between vehicle 301 and vehicle 302, distance 2 between vehicle 302 and vehicle 303, and distance 3 between vehicle 303 and vehicle 304.

According to the embodiments of FIG. 3, a vehicle(s) (e.g., vehicle 301, vehicle 302, vehicle 303, or vehicle 304 as shown in FIG. 3) in the vehicle platoon reports information (e.g., the real-time measured spacing value and the associated confidence level) to a BS (e.g., BS 300 as shown in FIG. 3). Then, the BS may send control information to a vehicle(s) in the vehicle platoon to manage or control this vehicle platoon based on the received information.

FIG. 4 illustrates another exemplary vehicle platoon in accordance with some embodiments of the present application. Similar to FIGS. 1, 2, and 3, the vehicle platoon implemented in the embodiments of FIG. 4 includes unicast transmission manner, groupcast transmission manner, and broadcast transmission manner; and the total number of vehicles, and names of vehicles (which represent a leading vehicle or a member vehicle) shown in FIG. 4 may vary.

Similar to FIGS. 2 and 3, each vehicle within the vehicle platoon shown in FIG. 4 keeps a certain distance from its preceding vehicle in the vehicle platoon, i.e., distance 1 between vehicle 401 and vehicle 402, distance 2 between vehicle 402 and vehicle 403, and distance 3 between vehicle 403 and vehicle 404.

According to the embodiments of FIG. 4, a member vehicle(s) (e.g., vehicle 402, vehicle 403, or vehicle 404 as shown in FIG. 4) in the vehicle platoon reports information (e.g., the real-time measured spacing value and the associated confidence level) to a leading vehicle (e.g., vehicle 401 as shown in FIG. 4). Then, the leading vehicle may send control information to a member vehicle(s) in the vehicle platoon to manage or control this vehicle platoon based on the received information.

Figure 5:
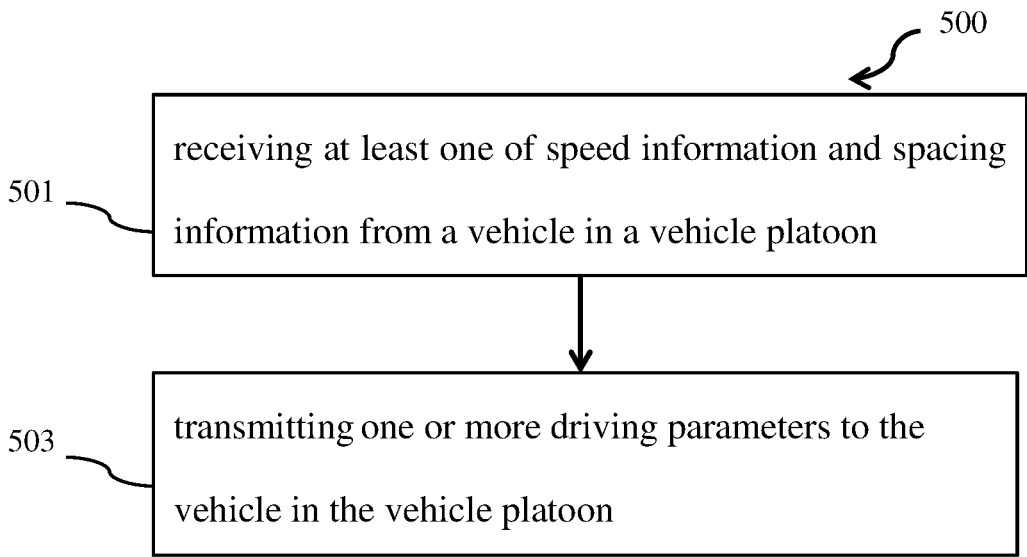
FIG. 5 illustrates a flow chart of a method for managing a vehicle platoon in accordance with some embodiments of the present application.

FIG. 5 illustrates a flow chart of a method for managing a vehicle platoon in accordance with some embodiments of the present application. Referring to FIG. 5, method 500 may be performed by a leading vehicle (e.g., vehicle 101, vehicle 201, vehicle 301, or vehicle 401 as shown in FIGS. 1-4, respectively), a BS (e.g., BS 100 or BS 300 as shown in FIGS. 1 and 3, respectively), a scheduling UE, or other network entity in some embodiments of the present application.

In operation 501, a leading vehicle, a BS, a scheduling UE, or other network entity receiving at least one of speed information and spacing information from a vehicle in a vehicle platoon. In operation 503, the leading vehicle, the BS, the scheduling UE, or other network entity transmits one or more driving parameters to the vehicle in the vehicle platoon. After receiving the one or more driving parameters, the vehicle in the vehicle platoon may adjust its speed and/or spacing to a preceding vehicle according to the driving parameters. It is appreciated that the order of operations in the present application may be adjusted. For example, operation 503 may be performed before operation 501.

In some embodiments, method 500 further comprises transmitting an adjustment command based on the spacing information and the speed information to the vehicle in the vehicle platoon. The vehicle receiving an adjustment command may adjust its speed and/or spacing to a preceding vehicle according to the adjustment command.

In some embodiments, method 500 further comprises receiving speed information and spacing information from another vehicle(s) in the vehicle platoon and transmitting an adjustment command based on the spacing information and the speed information to the abovementioned another vehicle(s). The abovementioned another vehicle(s) receiving an adjustment command may adjust its speed and/or spacing to a preceding vehicle according to the adjustment command.

Figure 6:
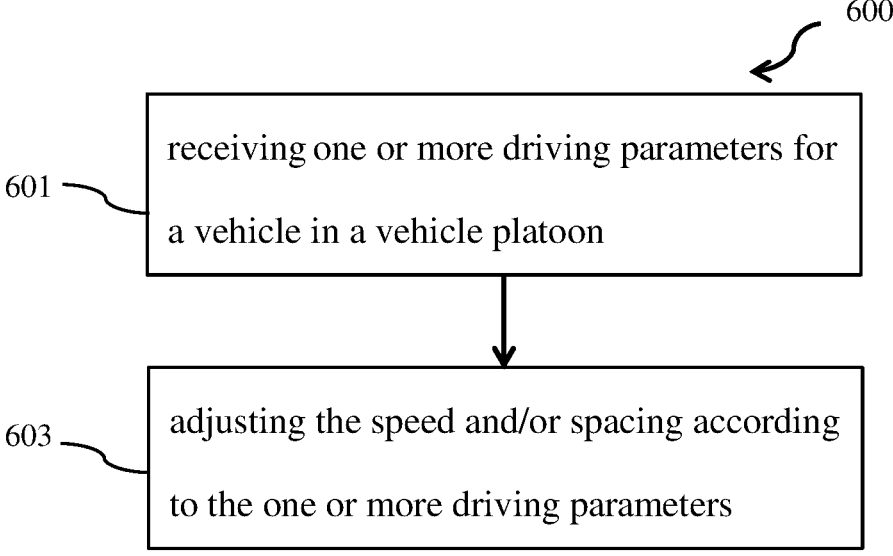
FIG. 6 illustrates a flow chart of a method performed by a vehicle in a vehicle platoon in accordance with some embodiments of the present application.

FIG. 6 illustrates a flow chart of a method performed by a vehicle in a vehicle platoon in accordance with some embodiments of the present application. Referring to FIG. 6, method 600 is performed by a vehicle (e.g., any one of vehicles 101-104, vehicles 201-204, vehicles 301-304, or vehicles 401-404 as shown in FIGS. 1-4, respectively) in a vehicle platoon in some embodiments of the present application.

In operation 601, a vehicle in a vehicle platoon receives one or more driving parameters for the vehicle from a leading vehicle, a BS, a scheduling UE, or other network entity. Using the one or more driving parameters, the vehicle in a vehicle platoon may adjust its speed and/or spacing to a preceding vehicle according to the driving parameters (i.e., operation 603).

In some embodiments, method 600 further comprises transmitting speed information of the vehicle, and transmitting spacing information of the vehicle. The speed information and spacing information are both real-time information. In some embodiments, method 600 further comprises transmitting a confidence level associated with the speed information, the spacing information, or both.

According to some embodiments of the present application, method 600 further comprises receiving an adjustment command for implementing speed and/or spacing target control from a leading vehicle, a BS, a scheduling UE, or other network entity. The speed and/or spacing target control may be achieved by two stages, one being "Achieve" stage and the other being "Maintenance" stage.

In particular, during "Achieve" stage, a vehicle(s) in a vehicle platoon, which receives an adjustment command, adjusts its current speed to a target speed or adjusts its current spacing to a preceding vehicle to a target spacing. At the end of the "Achieve" stage, the vehicle(s) will achieve or reach the target speed or the target spacing as instructed in the adjustment command. Then, during "Maintenance" stage, the vehicle(s) will maintain or keep the target speed or the target spacing unchanged.

Specifically, at the end of the "Achieve" stage, a leading vehicle, a BS, a scheduling UE, or other network entity may transmit a maintenance command and maintenance time information to the vehicle(s) in the vehicle platoon. In response to receiving a maintenance command and maintenance time information, the vehicle(s) starts "Maintenance" stage and maintains its current speed and spacing level in a specific time period, until receiving new signalling to end this stage.

For example, a maintenance command and "Maintenance" timer are transmitted to the vehicle(s) in the vehicle platoon. In the valid time of "Maintenance" timer, the vehicle(s) will ignore any speed and spacing adjustment signalling. Once the "Maintenance" timer is expired, the speed and spacing may be changed based on the adjustment signalling.

In response to receiving a further adjustment command, the vehicle(s) may re-enter into "Achieve" stage, in order to reach an updated target speed or an updated target spacing as instructed in the further adjustment command. After the "Achieve" stage, the vehicle(s) may re-enter into "Maintenance" stage to keep the updated target speed or the updated target spacing unchanged.

According to some embodiments of the present application, an adjustment command transmitted by a leading vehicle, a BS, a scheduling UE, or other network entity may include one or more driving parameters for a vehicle(s) in a vehicle platoon. According to some embodiments of the present application, a leading vehicle, a BS, a scheduling UE, or other network entity may transmit both an adjustment command for a vehicle(s) in a vehicle platoon and one or more driving parameters for the vehicle(s) via control signalling. The adjustment command may be indicated as an increase command or a decrease command.

According to some embodiments of the present application, one or more driving parameters, which may be included in an adjustment command or not, include an absolute speed value or an absolute spacing value for a vehicle(s) in a vehicle platoon.

For instance, if one or more driving parameters include a set of a target absolute speed value and a tolerance of speed, a vehicle(s) in a vehicle platoon adjusts its current speed, so as to conform to the set of the target absolute speed value and the tolerance of speed. If one or more driving parameters include a set of a target absolute spacing value and a tolerance of spacing, a vehicle(s) in a vehicle platoon adjusts its current speed, so as to conform to the set of the target absolute spacing value and the tolerance of spacing.

According to some embodiments of the present application, one or more driving parameters, which may be included in an adjustment command or not, include a ramp speed value or a ramp spacing value for a vehicle(s) in a vehicle platoon. Under these scenarios, the vehicle(s) may adjust its current speed and/or spacing dynamically using the ramp speed value or the ramp spacing value indicated in one or more driving parameters. A ramp speed value or a ramp spacing value may be referred to as a step size. The vehicle(s) may adjust its current speed and/or spacing dynamically step by step using the ramp speed value or the ramp spacing value indicated in one or more driving parameters according to the adjustment command.

For example, if one or more driving parameters include a ramp speed value, an adjustment command requests a vehicle(s) to increase or decrease its speed using the ramp speed value. If the one or more driving parameters include a ramp spacing value, the adjustment command requests the vehicle(s) to increase or decrease its spacing with a preceding vehicle using the ramp spacing value.

Figure 7:
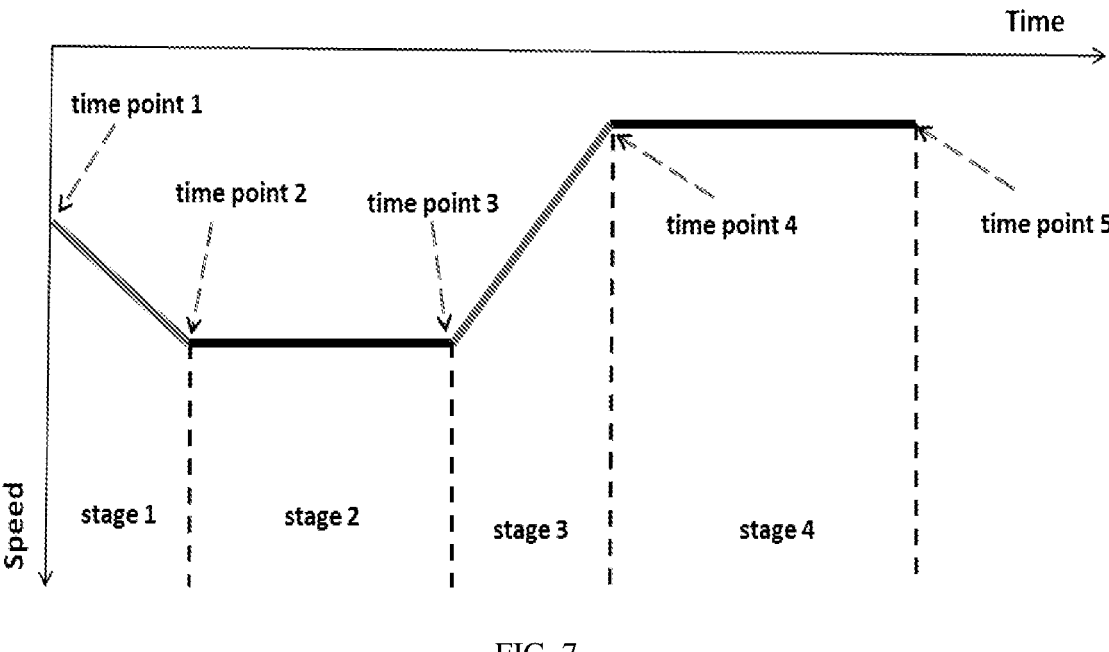
FIG. 7 illustrates an exemplary mechanism for controlling a vehicle platoon in accordance with some embodiments of the present application.

FIG. 7 illustrates an exemplary mechanism of controlling a vehicle platoon in accordance with some embodiments of the present application. FIG. 7 shows a two-stage speed target control mechanism for a vehicle(s) in a vehicle platoon, i.e., "Achieve" stage and "Maintenance" stage.

As shown in FIG. 7, stage 1 lasts from time point 1 to time point 2, stage 2 lasts from time point 2 to time point 3, stage 3 lasts from time point 3 to time point 4, and stage 4 lasts from time point 4 to time point 5. In embodiments of FIG. 7, both of stage 1 and stage 3 are "Achieve" stage, and both of stage 2 and stage 4 are "Maintenance" stage.

In some embodiments, at time point 1, a vehicle(s) in a vehicle platoon receives an adjustment command as well as driving parameter(s) via a control signalling. The adjustment command is a decrease command. During stage 1, the vehicle(s) continuously decreases its current speed with reference to a target speed included in the driving parameter(s).

At time point 2, i.e., at the end of stage 1, the vehicle(s) reaches the target speed in the driving parameter(s), and receives a maintenance command and maintenance time information from a leading vehicle, a BS, a scheduling UE, or other network entity. Then, the vehicle(s) enters into stage 2, i.e., "Maintenance" stage. Stage 2 lasts a time length indicated by the maintenance time information. During stage 2, the vehicle(s) keeps the target speed unchanged, while ignoring any speed and spacing adjustment signalling transmitted from a leading vehicle, a BS, a scheduling UE, or other network entity.

At time point 3, i.e., at the end of stage 2, the vehicle(s) receives a new adjustment command as well as new driving parameter(s) via a control signalling. The new adjustment command is an increase command. Then, the vehicle(s) enters into stage 3, i.e., "Achieve" stage. During stage 3, the vehicle(s) continuously increases its current speed with reference to a new target speed included in the new driving parameter(s).

At time point 4, i.e., at the end of stage 3, the vehicle(s) reaches the new target speed in the new driving parameter(s), and receives a new maintenance command and new maintenance time information from a leading vehicle, a BS, a scheduling UE, or other network entity. Then, the vehicle(s) enters into stage 4, i.e., "Maintenance" stage. Stage 4 lasts a time length indicated by the new maintenance time information. During stage 4, the vehicle(s) keeps the new target speed unchanged, while ignoring any speed and spacing adjustment signalling transmitted from a leading vehicle, a BS, a scheduling UE, or other network entity. At time point 5, stage 4 ends as indicated by the new maintenance time information.

It can be contemplated that, a two-stage spacing target control mechanism for a vehicle(s) in a vehicle platoon, i.e., "Achieve" stage and "Maintenance" stage, may also be applied to the subject application, and the specific contents are similar to the embodiments of FIG. 7 as described in the above text.

According to some embodiments of the present application, a vehicle(s) in a vehicle platoon may report speed conformance information to a leading vehicle, a BS, a scheduling UE, or other network entity, wherein the speed conformance information indicates whether a speed of a vehicle conforms to a requirement of a vehicle platoon which includes the vehicle. These embodiments may be applied to non-autonomous driving scenarios or autonomous driving scenarios.

For example, the speed conformance information includes a speed conformance monitoring status. The monitoring status may indicate three states compared with a required speed of a vehicle platoon, for example, "at," "above," or "below." Alternatively, the monitoring status may indicate two states compared with a required speed of a vehicle platoon, for example, "out of conformance" or "in conformance."

According to some embodiments of the present application, a leading vehicle, a BS, a scheduling UE, or other network entity may ask a vehicle(s) in a vehicle platoon to provide residual speed information to a network or the scheduling UE, so as to implement a smart speed control to the vehicle(s). Under these embodiments, the vehicle(s) in the vehicle platoon may report speed headroom reporting (SHR) information, wherein the SHR indicates a difference between a maximal allowed speed of the vehicle(s) and a current speed of the vehicle(s). For instance, the maximal allowed speed of a vehicle is determined by the vehicle's own performance. After receiving the SHR, a leading vehicle, a BS, a scheduling UE, or other network entity may know the residual speed room of the vehicle(s) that can be adjusted and configure an adjustment command correspondingly.

According to some embodiments of the present application, a leading vehicle, a BS, a scheduling UE, or other network entity may broadcast at least one of route information and destination information. A vehicle in or outside of a vehicle platoon may receive such information. Alternatively, a leading vehicle, a BS, a scheduling UE, or other network entity may transmit at least one of route information and destination information to a vehicle by a unicast transmission manner or a groupcast transmission manner.

After receiving the route information and/or destination information, if a vehicle outside of a vehicle platoon is interested in the vehicle platoon (e.g., having the same destination as the vehicle platoon), the vehicle may join into the vehicle platoon. Alternatively, after receiving the route information and/or destination information, if a vehicle within a vehicle platoon is not interested in the route or destination of the vehicle platoon, the vehicle may jump out from the vehicle platoon.

According to some embodiments of the present application, when a vehicle(s) in a vehicle platoon arrives at a special location or a series of defined locations, the vehicle(s) may report platoon waypoint information to other vehicle(s) in the vehicle platoon, for a verification purpose. For example, the platoon waypoint information may include inter-vehicle spacing information, the arrival location information, or a combination thereof. A vehicle(s) may use the platoon waypoint information to check whether it is driving along the intended route with other vehicle(s) in the vehicle platoon.

Figure 8:
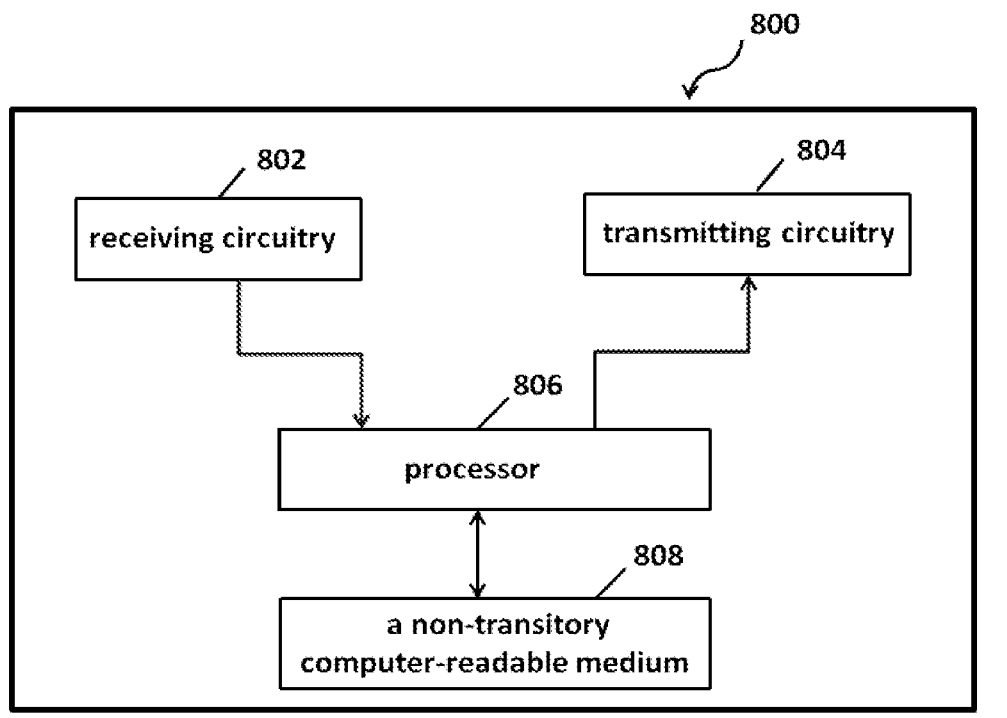
FIG. 8 illustrates a block diagram of an exemplary apparatus in accordance with some embodiments of the present application.

FIG. 8 illustrates a block diagram of an exemplary apparatus in accordance with some embodiments of the present application. Referring to FIG. 8, the apparatus 800 includes a non-transitory computer-readable medium 808, a receiving circuitry 802, a transmitting circuitry 804, and a processor 806. The processor 806 is coupled to the non-transitory computer-readable medium 808, the receiving circuitry 802, and the transmitting circuitry 804. The apparatus 800 may include a vehicle, a UE, a V2X UE or other device that is included in a vehicle platoon.

It is contemplated that some components are omitted in FIG. 8 for simplicity. In some embodiments, the receiving circuitry 802 and the transmitting circuitry 804 may be integrated into a single component (e.g., a transceiver).

In some embodiments, the non-transitory computer-readable medium 808 may have stored thereon computer-executable instructions to cause a processor to implement the operations with respect to the UE(s) as described above. For example, the computer-executable instructions may be executed to cause the processor 806 to control the receiving circuitry 802 and transmitting circuitry 804 to perform the operations with respect to the vehicle(s) as described and illustrated with respect to FIGS. 2-7.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method performed by a base station, the method comprising:

configuring control information comprising one or more driving parameters;

transmitting the control information comprising the one or more driving parameters to all vehicles in a vehicle platoon to adjust a speed of vehicles in the vehicle platoon, a spacing of vehicles in the vehicle platoon, or both;

wherein the one or more driving parameters comprise:

a set of a target speed and a tolerance of speed, wherein the set of the target speed and the tolerance of speed comprise a target speed range;

a set of a target spacing between a first vehicle and a second vehicle followed by the first vehicle and a tolerance of spacing, wherein the tolerance of spacing comprises a percentage of the target spacing;

a step size for incrementally adjusting a speed of a vehicle;

a step size for incrementally adjusting spacing between two vehicles; or a combination thereof;

after transmitting the control information comprising the one or more driving parameters to all vehicles in the vehicle platoon, receiving speed information, spacing information, or both from at least one vehicle in the vehicle platoon in response to a trigger event of the at least one vehicle, the trigger event comprising: expiration of a timer, expiration of a counter, the at least one vehicle arriving at a location, the at least one vehicle entering or re-entering into the vehicle platoon, or a combination thereof;

transmitting a maintenance command and maintenance time information to the first vehicle; and transmitting, within a time period indicated by the maintenance time information, adjusted control information comprising one or more adjusted driving parameters to the at least one vehicle in the vehicle platoon, wherein the adjusted control information comprising the one or more adjusted driving parameters are determined based on the speed information, spacing information, or both and the adjusted control information adjusts the speed of vehicles in the vehicle platoon, the spacing of vehicles in the vehicle platoon, or both, wherein the maintenance command indicates to the first vehicle to ignore the adjusted control information during the time period.

2. The method of claim 1, wherein the one or more driving parameters are pre-defined.

3. The method of claim 1, wherein the one or more driving parameters are transmitted to the first vehicle via a control signaling.

4. The method of claim 1, further comprising:

receiving speed information from the first vehicle; and receiving spacing information from the first vehicle.

5. The method of claim 4, further comprising transmitting an adjustment command to the first vehicle based on the spacing information and the speed information.

6. The method of claim 5, wherein:

if the one or more driving parameters include the step size for adjusting the speed of the vehicle, the adjustment command requests the first vehicle to increase or decrease its speed using the step size for adjusting the speed of the vehicle; and if the one or more driving parameters include the step size for adjusting spacing between two vehicles, the adjustment command requests the first vehicle to increase or decrease its spacing with the second vehicle using the step size for adjusting spacing between two vehicles.

7. The method of claim 4, wherein the spacing information represents either a distance between the first vehicle and the second vehicle or a time period for the first vehicle to reach the second vehicle.

8. The method of claim 7, wherein the spacing information represents the distance or the time period according to a configuration by a base station, a network entity, a scheduling user equipment, a head of the vehicle platoon, or according to a selection of the first vehicle.

9. The method of claim 4, further comprising receiving a confidence level associated with the speed information, the spacing information, or a combination thereof.

10. The method of claim 4, wherein the speed information and the spacing information are periodically transmitted by the first vehicle.

11. The method of claim 4, wherein the trigger event further comprises:

reaching a speed threshold;

reaching a spacing threshold;

or some combination thereof.

12. The method of claim 1, further comprising:

receiving speed conformance information from the first vehicle, wherein the speed conformance information indicates whether a speed of the first vehicle conforms to a requirement of the vehicle platoon.

13. The method of claim 1, further comprising:

receiving speed headroom reporting information from the first vehicle, wherein the speed headroom reporting indicates a difference between a maximal allowed speed and a current speed of the first vehicle.

14. The method of claim 1, further comprising:

broadcasting at least one of route information and destination information.

15. A method performed by a first vehicle in a vehicle platoon, the method comprising:

receiving control information comprising one or more driving parameters for the first vehicle to adjust a speed of vehicles in the vehicle platoon, a spacing of vehicles in the vehicle platoon, or both, wherein the control information comprising the one or more driving parameters are configured by a base station;

wherein the one or more driving parameters comprise:

a set of a target speed and a tolerance of speed, wherein the set of the target speed and the tolerance of speed comprise a target speed range;

a set of a target spacing between the first vehicle and a second vehicle followed by the first vehicle and a tolerance of spacing, wherein the tolerance of spacing comprises a percentage of the target spacing;

a step size for incrementally adjusting a speed of a vehicle;

a step size for incrementally adjusting spacing between two vehicles; or a combination thereof;

after receiving the control information comprising the one or more driving parameters, transmitting speed information spacing information, or both from at least one vehicle in the vehicle platoon in response to a trigger event of the at least one vehicle, the trigger event comprising: expiration of a timer, expiration of a counter, the at least one vehicle arriving at a location, the at least one vehicle entering or re-entering into the vehicle platoon, or a combination thereof;

receiving a maintenance command and maintenance time information to the first vehicle; and receiving, within a time period indicated by the maintenance time information, adjusted control information comprising one or more adjusted driving parameters, wherein the adjusted control information comprising the one or more adjusted driving parameters are determined based on the transmitted speed information, spacing information, or both and the adjusted control information adjusts the speed of vehicles in the vehicle platoon, the spacing of vehicles in the vehicle platoon, or both, wherein the maintenance command indicates to the first vehicle to ignore the adjusted control information during the time period.

16. The method of claim 15, wherein the one or more driving parameters are pre-defined.

17. A base station, comprising:

at least one memory; and at least one processor coupled with the at least one memory and configured to cause the base station to:

configure control information comprising one or more driving parameters;

transmit the control information comprising the one or more driving parameters to all vehicles in a vehicle platoon to adjust a speed of vehicles in the vehicle platoon, a spacing of vehicles in the vehicle platoon, or both;

wherein the one or more driving parameters comprise:

a set of a target speed and a tolerance of speed, wherein the set of the target speed and the tolerance of speed comprise a target speed range;

a set of a target spacing between a first vehicle and a second vehicle followed by the first vehicle and a tolerance of spacing, wherein the tolerance of spacing comprises a percentage of the target spacing;

a step size for incrementally adjusting a speed of a vehicle;

a step size for incrementally adjusting spacing between two vehicles; or a combination thereof;

after transmitting the control information comprising the one or more driving parameters to all vehicles in the vehicle platoon, receive speed information, spacing information, or both from at least one vehicle in the vehicle platoon, in response to a trigger event of the at least one vehicle, the trigger event comprising: expiration of a timer, expiration of a counter, the at least one vehicle arriving at a location, the at least one vehicle entering or re-entering into the vehicle platoon, or a combination thereof;

transmit a maintenance command and maintenance time information to the first vehicle; and transmit, within a time period indicated by the maintenance time information, adjusted control information comprising one or more adjusted driving parameters to the at least one vehicle in the vehicle platoon, wherein the adjusted control information comprising the one or more adjusted driving parameters are determined based on the speed information, spacing information, or both and the adjusted control information adjusts the speed of vehicles in the vehicle platoon, the spacing of vehicles in the vehicle platoon, or both, wherein the maintenance command indicates to the first vehicle to ignore the adjusted control information during the time period.

18. A first vehicle in a vehicle platoon, comprising:

at least one memory; and at least one processor coupled with the at least one memory and configured to cause the first vehicle to:

receive control information comprising one or more driving parameters for the first vehicle to adjust a speed of vehicles in the vehicle platoon, a spacing of vehicles in the vehicle platoon, or both, wherein the control information comprising the one or more driving parameters are configured by a base station;

wherein the one or more driving parameters comprise:

a set of a target speed and a tolerance of speed, wherein the set of the target speed and the tolerance of speed comprise a target speed range;

a set of a target spacing between the first vehicle and a second vehicle followed by the first vehicle and a tolerance of spacing, wherein the tolerance of spacing comprises a percentage of the target spacing;

a step size for incrementally adjusting a speed of a vehicle;

a step size for incrementally adjusting spacing between two vehicles; or a combination thereof;

after receiving the control information comprising the one or more driving parameters, transmit speed information, spacing information, or both from at least one vehicle in the vehicle platoon in response to a trigger event of the at least one vehicle, the trigger event comprising: expiration of a timer, expiration of a counter, the at least one vehicle arriving at a location, the at least one vehicle entering or re-entering into the vehicle platoon, or a combination thereof;

receive a maintenance command and maintenance time information to the first vehicle; and receive, within a time period indicated by the maintenance time information, adjusted control information comprising one or more adjusted driving parameters, wherein the adjusted control information comprising the one or more adjusted driving parameters are determined based on the transmitted speed information, spacing information, or both and the adjusted control information adjusts the speed of vehicles in the vehicle platoon, the spacing of vehicles in the vehicle platoon, or both, wherein the maintenance command indicates to the first vehicle to ignore the adjusted control information during the time period.

* * * * *